US009652291B2

United States Patent
Biswal et al.

(10) Patent No.: US 9,652,291 B2
(45) Date of Patent: *May 16, 2017

(54) SYSTEM AND METHOD UTILIZING A SHARED CACHE TO PROVIDE ZERO COPY MEMORY MAPPED DATABASE

(71) Applicant: Palantir Technologies Inc., Palo Alto, CA (US)

(72) Inventors: Punya Biswal, Palo Alto, CA (US); Beyang Liu, Palo Alto, CA (US); Eugene Marinelli, Palo Alto, CA (US); Nima Ghamsari, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,526

(22) Filed: Jun. 3, 2016

(65) Prior Publication Data

US 2016/0283277 A1  Sep. 29, 2016

Related U.S. Application Data

(63) Continuation of application No. 13/827,627, filed on Mar. 14, 2013, now Pat. No. 9,367,463.

(51) Int. Cl.
*G06F 12/08* (2016.01)
*G06F 9/50* (2006.01)
(Continued)

(52) U.S. Cl.
CPC .......... *G06F 9/5016* (2013.01); *G06F 12/084* (2013.01); *G06F 12/0813* (2013.01);
(Continued)

(58) Field of Classification Search
CPC .. G06F 12/084; G06F 17/3048; G06F 9/5016; G06F 12/0813; G06F 12/1009;
(Continued)

(56) References Cited

U.S. PATENT DOCUMENTS 5,418,950 A   5/1995 Li et al.
5,428,737 A   6/1995 Li et al.
(Continued)

FOREIGN PATENT DOCUMENTS

DE   102014103482   9/2014
EP      1647908      4/2006
(Continued)

OTHER PUBLICATIONS

"A Quick Guide to UniProtKB Swiss-Prot & TrEMBL," Sep. 2011, 2 pages.
(Continued)

*Primary Examiner* — Yaima Rigol
*Assistant Examiner* — Glenn Gossage
(74) *Attorney, Agent, or Firm* — Hickman Palermo Becker Bingham LLP

(57) ABSTRACT

Methods and systems for providing a plurality of applications with concurrent access to data are disclosed. One such method includes identifying attributes of an expected data set to be accessed concurrently by the applications, initializing a shared cache with a column data store configured to store the expected data set in columns, and creating a memory map for accessing a physical memory location in the shared cache. The method may also include mapping the applications' data access requests to the shared cache with the memory map. Only one instance of the expected data set is stored in memory, so each application is not required to create additional instances of the expected data set in the application's memory address space. Therefore, larger expected data sets may be entirely stored in memory without limiting the number of applications running concurrently.

21 Claims, 6 Drawing Sheets

(51) Int. Cl.
*G06F 17/30* (2006.01)
*G06F 12/084* (2016.01)
*G06F 12/0813* (2016.01)
*G06F 12/1009* (2016.01)

(52) U.S. Cl.
CPC ...... *G06F 12/1009* (2013.01); *G06F 17/3048* (2013.01); *G06F 2212/1016* (2013.01); *G06F 2212/60* (2013.01); *G06F 2212/65* (2013.01)

(58) Field of Classification Search
CPC ......... G06F 2212/1016; G06F 2212/60; G06F 2212/65
See application file for complete search history.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Zbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bigham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez, Jr. et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing et al. | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 9,367,463 B2 * | 6/2016 | Biswal | G06F 12/084 |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1* | 11/2006 | Carro | G06F 17/245 715/205 |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0321008 A1 | 12/2011 | Jhoney et al. | |

(56) References Cited

U.S. PATENT DOCUMENTS

| | | |
|---|---|---|
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508293 | 5/2014 |
| GB | 2508503 | 6/2014 |
| NZ | 622485 | 3/2015 |
| NZ | 616212 | 5/2015 |
| WO | WO 00/34895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.

Alur et al., "Chapter 2: IBM InfoSphere DataStage Stages," IBM InfoSphere DataStage Data Flow and Job Design, Jul. 1, 2008, pp. 35-137.

Bae et al., "Partitioning Algorithms for the Computation of Average Iceberg Queries," DaWaK 2000, LNCS 1874, pp. 276-286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle, Phillip Lee, "Reducing Cross-Domain Call Overhead Using Batched Futures," May 1994, Massachusetts Institute of Technology, 96 pages.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

"Frequently Asked Questions about Office Binder 97," http://web.archive.org/web/20100210112922/http://support.microsoft.com/kb/8431 47 printed Dec. 18, 2006 in 5 pages.

Goldstein et al., "Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: an Open RDF Infastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 51-55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mizrachi, Ilene, "Chapter 1: GenBank: The Nucleotide Sequence Database," The NCBI Handbook, Oct. 2002, pp. 1-14.

Russell et al., "NITELIGHT: A Graphical Tool for Semantic Query Construction," 2008, pp. 1-10.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008. 16 pages.

Stamos et al., "Remote Evaluation," Journal ACM Transactions on Programming Languages and Systems (TOPLAS) vol. 12, Issue 4, Oct. 1990, pp. 537-564.

"The FASTA Program Package," fasta-36.3.4, Mar. 25, 2011, pp. 1-29.

Wollrath et al., "A Distributed Object Model for the Java System," Proceedings of the $2^{nd}$ Conference on USENEX, Conference on Object-Oriented Technologies (COOTS), Jun. 17, 1996, pp. 219-231.

Notice of Acceptance for New Zealand Patent Application No. 622485 dated Nov. 24, 2014.

Notice of Acceptance for New Zealand Patent Application No. 616212 dated Jan. 23, 2015.

Notice of Acceptance for New Zealand Patent Application No. 616299 dated Apr. 7, 2015.

(56) References Cited

OTHER PUBLICATIONS

Official Communication for New Zealand Patent Application No. 622414 dated Mar. 24, 2014.
Official Communication for New Zealand Patent Application No. 622484 dated Apr. 2, 2014.
Official Communication for European Patent Application No. 14159629.6 dated Jul. 31, 2014.
Official Communication for European Patent Application No. 14159629.6 dated Sep. 22, 2014.
Official Communication for Canadian Patent Application No. 2807899 dated Oct. 24, 2014.
Official Communication for New Zealand Patent Application No. 622485 dated Nov. 21, 2014.
Official Communication for Great Britain Patent Application No. 1404574.4 dated Dec. 18, 2014.
Official Communication for Australian Patent Application No. 2013237710 dated Jan. 16, 2015.
Official Communication for New Zealand Patent Application No. 616299 dated Jan. 26, 2015.
Official Communication for Australian Patent Application No. 2013237658 dated Feb. 2, 2015.
Official Communication for Australian Patent Application No. 2014201580 dated Feb. 27, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for Canadian Patent Application No. 2829266 dated Apr. 28, 2015.
Official Communication for Canadian Patent Application No. 2828264 dated Apr. 28, 2015.
Official Communication for European Patent Application No. 15159520.4 dated Jul. 15, 2015.
Official Communication for Canadian Patent Application No. 2807899 dated Jul. 20, 2015.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for European Patent Application No. 13157474.1 dated Oct. 30, 2015.
Official Communication for European Patent Application No. 14159175.0 dated Feb. 4, 2016.
European Patent Office, "Search Report" in application No. 14159175.0-1951, dated Jul. 10, 2014, 10 pages.
Official Communication for Canadian Patent Application No. 2829266 dated Apr. 1, 2016.
Official Communication for European Patent Application No. 14159464.8 dated Feb. 18, 2016.
Official Communication for European Patent Application No. 13157474.1 dated Apr. 29, 2016.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Ivanova et al., ÒAn Architecture for Recycling Intermediates in a Column-Store,Ó Proceedings of the 35th Sigmod International Conference on Management of Data, SIGMOD '09, Jun. 29-Jul. 2, 2009, pp. 309-320.
Official Communication for Canadian Patent Application No. 2828264 dated Apr. 11, 2016, 4 pages.

* cited by examiner

SYSTEM AND METHOD UTILIZING A SHARED CACHE TO PROVIDE ZERO COPY MEMORY MAPPED DATABASE

BENEFIT CLAIM

This application claims the benefit under 35 U.S.C. §120 as a continuation of application Ser. No. 13/827,627, filed Mar. 14, 2013, now U.S. Pat. No. 9,367,463, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

Field of the Invention

Embodiments of the invention generally relate to data analysis and, more specifically, to techniques for providing a shared cache as a zero copy memory mapped database.

Description of the Related Art

Some programming languages provide an execution environment that includes memory management services for applications. That is, the execution environment manages application memory usage. The operating system provides each process, including the execution environment, with a dedicated memory address space. The execution environment assigns a memory address space to execute the application. The total addressable memory limits how many processes may execute concurrently and how much memory the operating system may provide to any given process.

In some data analysis systems, applications perform queries against a large common data set, e.g. an application that performs financial analyses on a common investment portfolio. In such a case, the financial analysis application may repeatedly load portions of the entire data set into the application's memory or the application may load the entire expected data set. Frequently, even if multiple applications analyze the same data set, the data is loaded into the memory address space of each application. Doing so takes time and system resources, which increases system latency and effects overall system performance. The amount of memory in a system limits the number of execution environment processes that can run concurrently with memory address space sizable enough to allow the application to load an entire expected data set.

The scalability of the system is limited as the expected data set grows, because the system has to either reduce the number of applications that can run concurrently or increase the rate at which portions of the expected data set must be loaded, causing overall system performance to degrade.

SUMMARY OF THE INVENTION

One embodiment of the invention includes a method for a plurality of applications to access a data set concurrently. This method may generally include identifying a plurality of attributes of an expected data set to be accessed concurrently by the plurality of applications and allocating a memory space for a shared cache. The shared cache comprises a column data store configured to store data for each of the plurality of attributes of the expected data set in columns. This method may further include retrieving the expected data set from a database, populating the shared cache with the expected data set; and storing memory address locations corresponding to the columns of the column data store of the shared cache for access by the plurality of applications. Each application generates a memory map from memory locations in a virtual address space of each respective application to the stored address memory locations.

Other embodiments of the present invention include, without limitation, a computer-readable storage medium including instructions that, when executed by a processing unit, cause the processing unit to implement aspects of the approach described herein as well as a system that includes different elements configured to implement aspects of the approach described herein.

Advantageously, the method stores a single instance of the expected data set in memory, so each application does not need to create an additional instance of the expected data set. Therefore, larger expected data sets may be stored in memory without limiting the number of applications running concurrently.

Further, the method may arrange the expected data set in the shared cache for efficient data analysis. For instance, the method may arrange the expected data set in columns, which facilitates aggregating subsets of the expected data set.

BRIEF DESCRIPTION OF THE DRAWINGS

So that the manner in which the features of the present invention recited above can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a shared cache as a zero copy memory mapped database. Multiple applications access the shared cache concurrently. In one embodiment, the shared cache is a file that each application maps into the virtual memory address space of that application. Doing so allows multiple applications to access the shared cache simultaneously. Note, in the present context, an expected data set generally refers to records from a database repository designated to be loaded into the shared cache. A process, referred to herein as a synchronizer, populates, and in some cases updates, a data structure storing the expected data set in the shared cache. To access the shared cache, each running application maps the shared cache into a virtual memory address space of the execution environment in which the application runs. The mapping translates virtual memory addresses (in a user address space) to memory addresses in the shared cache (the system address space). In one embodiment, the applications only read data from the data stored in the shared cache. As a result, applications can access the data concurrently without causing conflicts.

In one embodiment, the data structure is a column data store in which data from the database repository is stored contiguously in columns. The applications analyze data entities called models. Models include a combination of data attributes from a database repository and different types of models include different data attributes. The expected data set includes several different types of models. The synchronizer arranges the column data store to include a column for every data attribute of the models included in the expected data set. Application developers build the applications upon data access methods that abstract the interactions with the actual columns of the column data store, so that application developers can readily access the data of a model without regard for the underlying data structure. The columns allow efficient aggregation of the data, because as an application iterates through a data attribute of a group of models, a data access method simply reads sequential entries in a column. For example, an expected data set may include personal checking account models. In such a case, the column data store would include the data of the personal checking account models in columns, such as a column for account balances, a column for account numbers, and a column for recent transactions. The application accesses the columns of data through calls to data access methods.

In the following description, numerous specific details are set forth to provide a more thorough understanding of the present invention. However, it will be apparent to one of skill in the art that the present invention may be practiced without one or more of these specific details.

Figure 1:
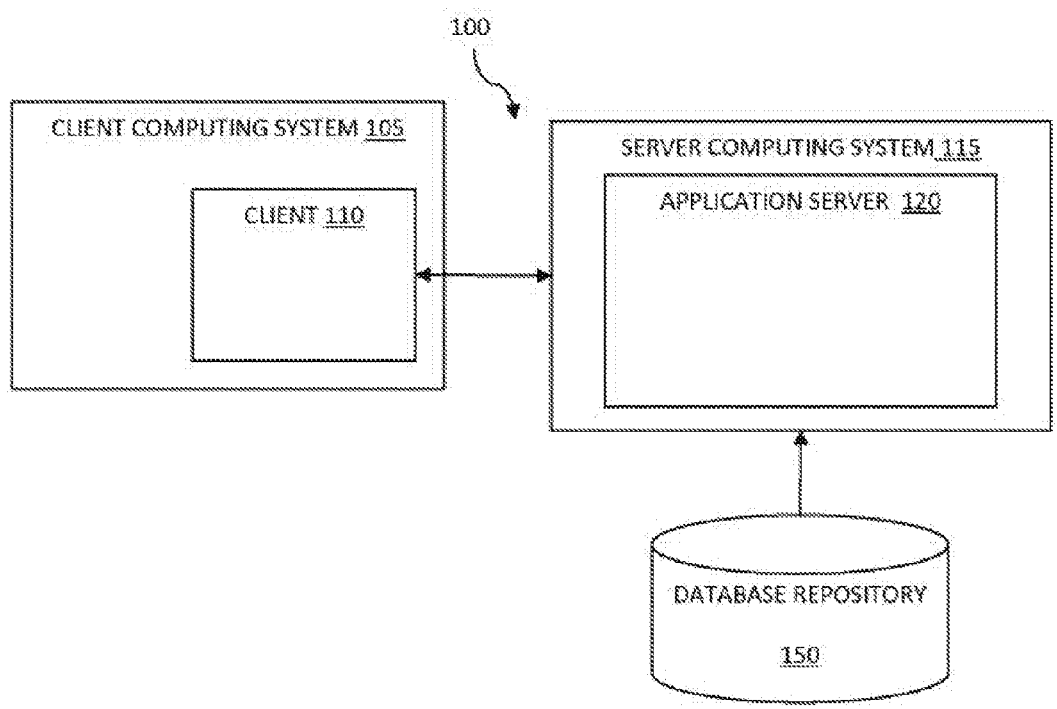
FIG. 1 is a block diagram illustrating an example data analysis system configured to implement one or more aspects of the present invention.

FIG. 1 is a block diagram illustrating an example data analysis system 100, according to one embodiment. As shown, the data analysis system 100 includes a client computing system 105, a client 110, a server computer system 115, an application server 120, and a database repository 150. The client 110 runs on the client computing system 105 and requests data analysis activities from the application server 120 that performs the data analysis activities at a server computing system 115 on data retrieved from the database repository 150.

The client 110 translates user inputs into requests for data analysis by the application server 120. The client 110 runs on computing systems connected to the server computing system 115 over a network. For example, the client 110 may be dynamic web pages in a browser or a web-based Java® application running on a client computing system 105. Alternatively, the client 110 may run on the same server computing system 115 as the application server 120. In any event, a user interacts with the data analysis system 100 through client 110.

The application server 120 performs the analysis upon data read from the database repository 150. A network connects the database repository 150 and the server computing system 115. The database repository 150 stores records of data. For example, the database repository 150 may be a Relational Database Management System (RDBMS) storing data as rows in relational tables. Alternatively, the database repository 150 may exist on the same server computing system 115 as the application server 120.

In one embodiment, a user sets up an application server 120 with an expected data set. Once configured, the expected data set is made available to multiple clients 110 for analysis.

Figure 2:
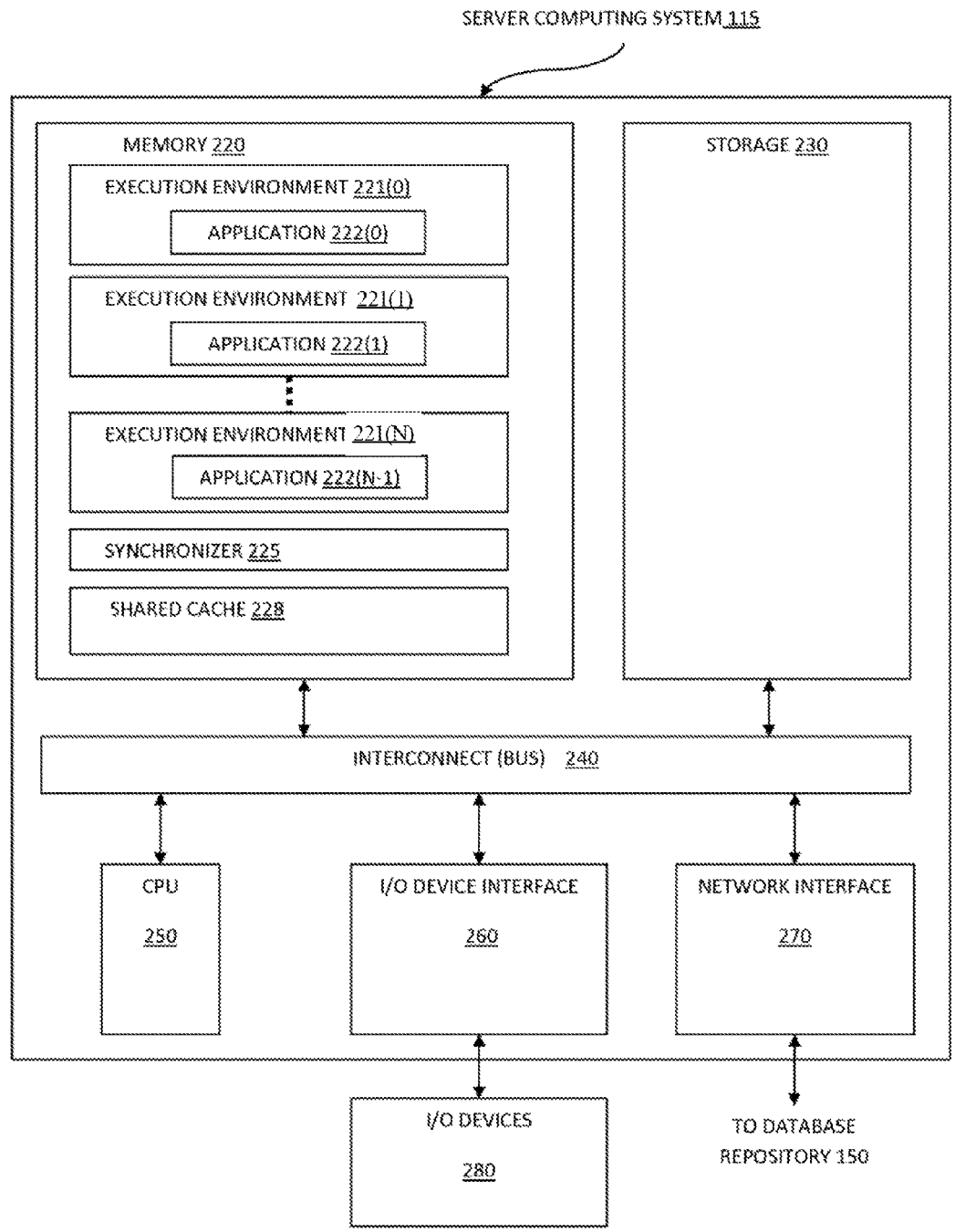
FIG. 2 illustrates an example server computing system configured with a shared cache, according to one embodiment.

FIG. 2 illustrates an example server computing system 115 configured with a shared cache 228, according to one embodiment. The shared cache 228 provides applications 222 running in execution environments 221 with concurrent access to data stored in the shared cache 228. As shown, the server computing system 115 includes, without limitation, a central processing unit (CPU) 250, a network interface 270, a memory 220, and a storage 230, each connected to an interconnect (bus) 240. The server computing system 115 may also include an I/O device interface 260 connecting I/O devices 280 (e.g., keyboard, display and mouse devices) to the computing system 115. Further, in context of this disclosure, the computing elements shown in server computing system 115 may correspond to a physical computing system (e.g., a system in a data center) or may be a virtual computing instance executing within a computing cloud.

The CPU 250 retrieves and executes programming instructions stored in memory 220 as well as stores and retrieves application data residing in memory 220. The bus 240 is used to transmit programming instructions and application data between the CPU 250, I/O device interface 260, storage 230, network interface 270, and memory 220. Note, CPU 250 is included to be representative of a single CPU, multiple CPUs, a single CPU having multiple processing cores, a CPU with an associate memory management unit, and the like. The memory 220 is generally included to be representative of a random access memory. The storage 230 may be a disk drive storage device. Although shown as a single unit, the storage 230 may be a combination of fixed and/or removable storage devices, such as fixed disc drives, removable memory cards, or optical storage, network attached storage (NAS), or a storage area-network (SAN).

The requests for data analyses and the results of data analyses are transmitted between the client 110 and the applications 222 over the network via the network interface 270. Illustratively, the memory 220 includes applications 222 running in execution environments 221, a synchronizer 225, and a shared cache 228. The applications 222 perform data analyses using data from the shared cache 228. Prior to performing a data analysis, the synchronizer 225 initializes the shared cache 228 with data retrieved from the database repository 150. For example, the synchronizer 225 may issue database queries over the network to the database repository 150 via the network interface 270. Once the synchronizer 225 initializes (or updates) the shared cache 228, an application 222 maps the shared cache 228 into the virtual address space local to the execution environment 221 of the application 222. This memory mapping allows the application 222 to access the shared cache 228 and read the data from the shared cache 228. When other applications 222 also map the shared cache into the virtual address space local to the execution environment 221 of the applications 222, then the applications 222 may concurrently access the shared cache 228.

Although shown in memory 220, the shared cache 228 may be stored in memory 220, storage 230, or split between memory 220 and storage 230. Further, although shown as a single element the shared cache 228 may be divided or duplicated.

In some embodiments, the database repository 150 may be located in the storage 230. In such a case, the database queries and subsequent responses are transmitted over the bus 240. As described, the client 110 may also be located on the server computing system 115, in which case the client 110 would also be stored in memory 220 and the user would utilize the I/O devices 280 to interact with the client 110 through the I/O device interface 260.

Figure 3:
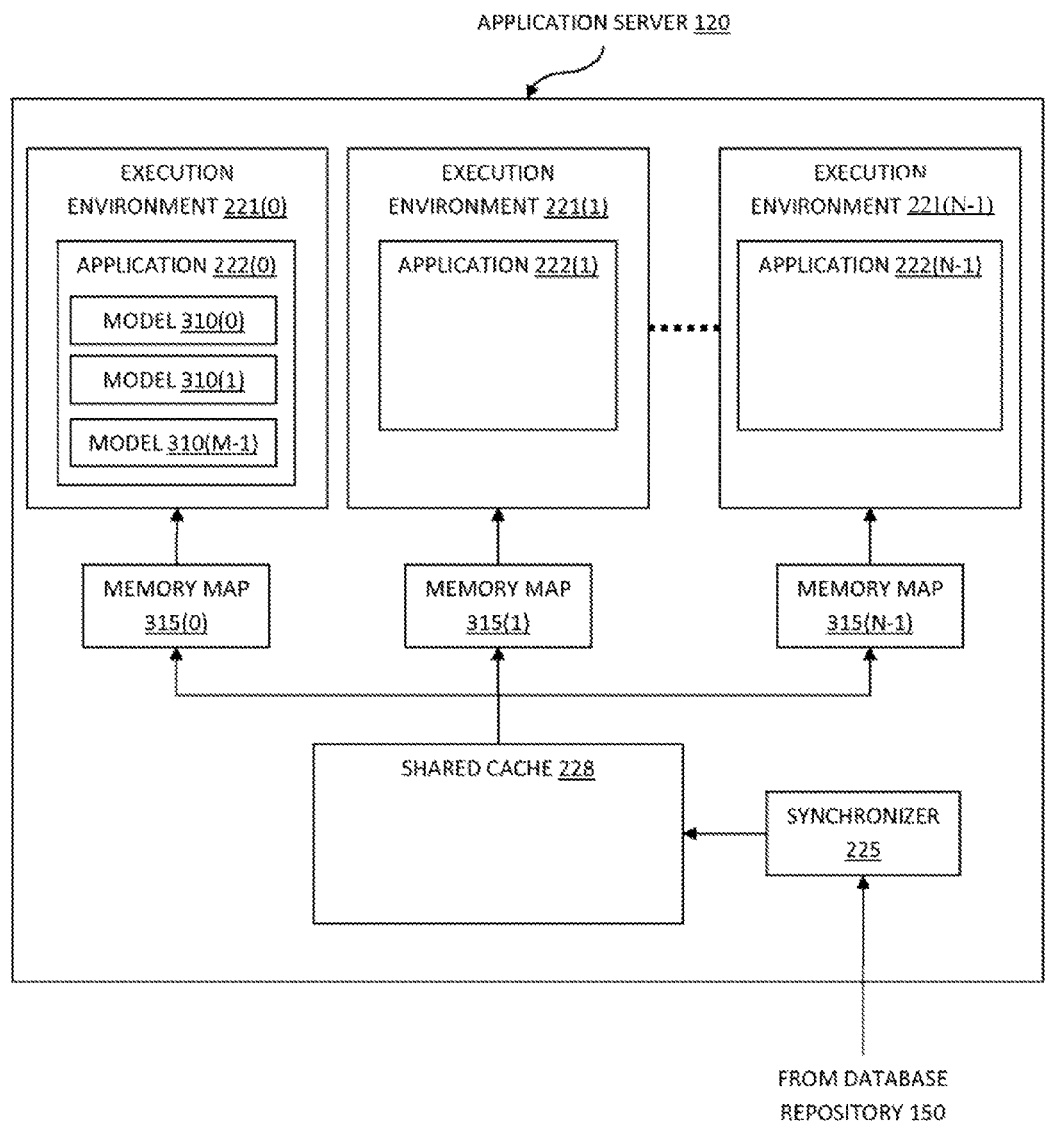
FIG. 3 is a block diagram of the flow of data in an application server of FIG. 1, according to one embodiment.

FIG. 3 illustrates a flow of data as multiple applications 222 concurrently access the shared cache 228 on the application server 120, according to one embodiment. As shown, the application server 120 includes the synchronizer 225, shared cache 228, and applications 222 running in execution environments 221, and a memory map 315 for each execution environment 221. Further, each application 222 accesses one or more models 310.

The application 222 (application 222(0), for example), analyzes models 310 that include a combination of data attributes from the database repository 150. To setup the shared cache 228 for the applications 222, the synchronizer 225 reads data from the database repository 150. The synchronizer 225 writes data to the shared cache 228. As it writes the data to the shared cache 228, the synchronizer 225 organizes the data according to a data structure. For example, the synchronizer may organize the data into a column data store for efficient data access. The synchronizer 225 provides address references to the shared cache 228 that the applications 222 use for accessing the data of the models 310 in the data structure of the shared cache 228.

In one embodiment, the operating system of the server computing system 115 manages the memory map 315 to the shared cache 228. The memory map 315 maps a virtual address space local to each execution environment 221 to physical memory addresses in the shared cache 228. The address space of each execution environment 221 is a range of virtual memory locations. The virtual memory locations appear to the execution environment 221 as one large block of contiguous memory addresses. The memory map 315 contains a table of virtual memory locations and corresponding physical memory locations. The virtual memory locations are mapped to the physical memory locations in either memory 220 or storage 230 by looking up the virtual memory location in the memory map 315 and retrieving the corresponding physical memory location. When an application reads data from the virtual address space, a memory map 315 translates a memory address from the virtual address space to the physical address space. Specifically, the application receives the data from the physical memory location in the address space of the shared cache 228.

The application 222, the execution environment 221, the operating system, or any other component responsible for translating memory addresses may create this mapping. For example, an application 222 may be a Java® application running in the Java® Virtual Machine (JVM) execution environment. In such a case, the operating system provides the JVM virtual memory address space to execute the Java® application for data analysis. The JVM runs the Java® application in a portion of the virtual memory address space, called the heap. Once created, the memory map 315 maps a portion of the remaining virtual memory address locations to physical memory locations in the address space of the shared cache 228. When multiple JVMs run Java® applications for data analysis on the same application server 120, the memory maps 315 all map to the same shared cache 228, providing concurrent access.

Figure 4:
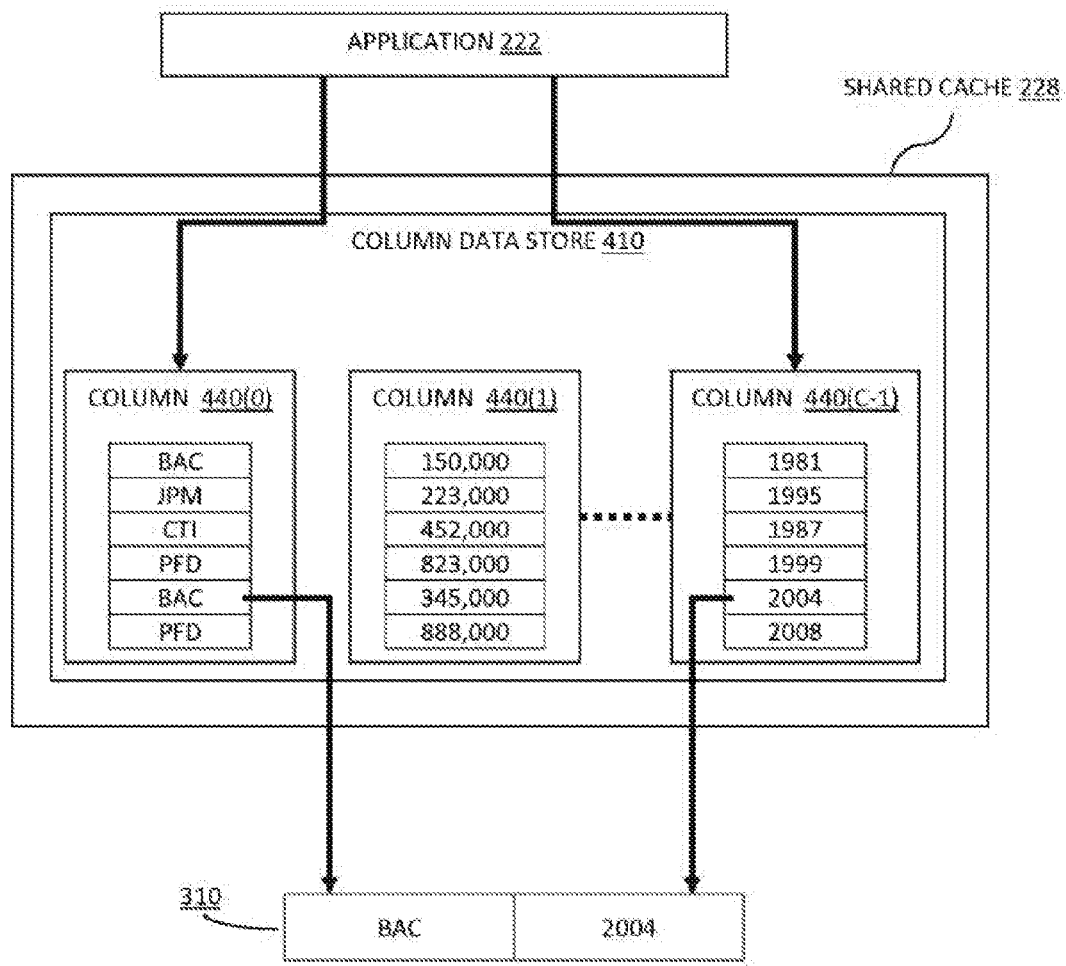
FIG. 4 illustrates an example of a shared cache configured as a column store, according to one embodiment.

FIG. 4 illustrates an example of the shared cache 228 configured as a column data store 410, according to one embodiment of the present invention. As shown, the shared cache 228 includes the column data store 410, which includes columns 440. An application 222 accesses the data of a model 310 from the columns 440 that correspond to the attributes of the model 310. An analysis based upon aggregating a particular attribute of many models 310 of the same type may access a particular column 440(0) that corresponds to the attribute instead of all columns 440 that correspond to that type of model 310. Note, the synchronizer 225 may arrange the columns 440 for a particular type of model 310 together or according to a number of different designs.

In one embodiment, a user configures the data analysis system 100 for analyzing data of a given domain by selecting types of models 310 to analyze. The models 310 include data attributes from the database repository 150, so the synchronizer 225 retrieves the database records to populate the column data store 410 based upon the selected models 310. The synchronizer 225 creates the column data store 410 to include a column 440 for each attribute of the selected models 310.

For example, assume a model 310 representing a home mortgage is composed of three attributes, such as the bank name, loan amount, and the mortgage issue date. In such a case, the synchronizer 225 would query the database repository 150 for the data to build three columns 440 in the column data store 410. The first column 440(0) would include a list of bank names, the second column 440(1) would include the loan amounts, and the last column 440 (C-1) would include the mortgage issue date. Depending on the organization of the database repository 150, a model 310 may include data from a single record in a table in the database repository 150, data from multiple tables in the database repository 150, or aggregated data from multiple records in the database repository 150.

An application 222 accesses the data of a model 310 by reading the data values at equal indexes across the columns 440 of the model. Alternatively, the application may iterate through one attribute of a group of models, which involves reading sequential entries in a single column 440.

In the example of a model 310 representing a home mortgage, the application 222 may call a data access method to create an aggregate of an attribute of the model 310, such as the loan amounts attribute. The data access method would read sequential entries in the second column 440(1) that includes the loan amounts. The data access method only needs to find, read, and aggregate the entries in the one column 440(1). This is very efficient because the application 222 easily calculates the memory addresses of sequential entries by simply incrementing a pointer from one entry to the next.

A database repository 150 organizes data by records in tables, so to generate the same average loan amount value, without using the shared cache 228 and the column data store 410, a table with the loan amount attribute would need to be located and the records from the table would need to be read to find the loan amount data. To find the loan amount data in a record the data analysis system would have to access the entire record and then the data analysis system would have to follow pointers from one data item of the record to the next data item of the record until finding the loan amount value of the record.

The contiguous storage of the data values in columns 440 in a column data store 410 supports data aggregation. As a result, an application 222 only needs to read the columns 440 involved in an analysis, instead of entire records; as previously discussed in the example of determining the average home mortgage loan amount. Not only does less data have to be read, but reading the relevant data is more efficient because the relevant data is stored sequentially in memory 220, so it is easy to determine the address of subsequent entries as the application 222 iterates through the column 440. Further, since the data entries are stored contiguously, the data spans fewer pages of memory 220, reducing the overhead associated with swapping memory pages.

As described the synchronizer 225 provides address reference to a column 440 to the application 222 for accessing data in the column 440. The address reference is a virtual memory location. The operating system maps the virtual memory location of the column 440 in the virtual memory address space in which an application 222 runs to the physical memory location of the column 440 in a shared cache 228. Therefore, the application 222 accesses the column 440 as though the column 440 was included in one large block of contiguous memory addresses belonging to the execution environment 221 that the application 222 runs in.

Figure 5:
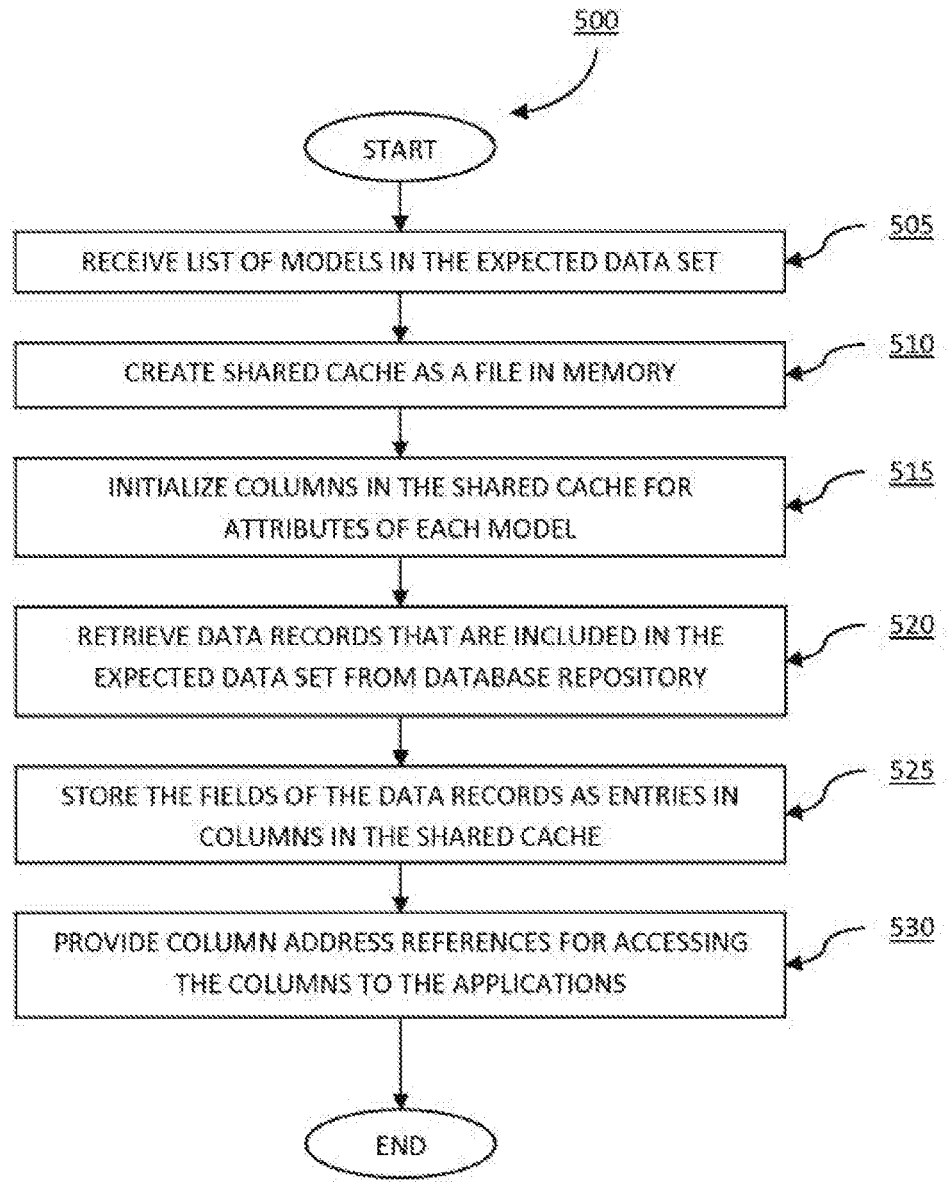
FIG. 5 illustrates a method for setting up or initializing the shared cache and for providing a memory map to applications, according to one embodiment.

FIG. 5 illustrates a method for initializing the shared cache 228 and providing the memory map 315 to the applications 222, according to one embodiment. Note, in this example, the initialization of the shared cache 228 is discussed from the perspective of the synchronizer 225. Although the method steps are described in conjunction with the systems of FIGS. 1-4, persons of ordinary skill in the art will understand that any system configuration to perform the method steps, in any order, is within the scope of the invention.

As shown, method 500 begins at step 505, where the synchronizer 225 receives a list of models 310 to include in the expected data set. A user defines the expected data set available for analysis by selecting which models 310 the system should make available for multiple applications 222 to analyze concurrently. The user may make the selections from a user interface at the application server 120, or may create a script that includes the selections.

In step 510, the synchronizer 225 creates a shared cache 228 as a file in memory 220. One skilled in the art will appreciate that the shared cache 228 could be stored in memory 220 only or in some combination of memory 220 and storage 230. The operating system generally determines the physical location of the shared cache 228 or portions of the shared cache 228 based upon the amount of memory 220 available. The server computer system 115 contains sufficient memory 220 to store the entire shared cache 228 in memory 220.

In step 515, the synchronizer 225 initializes a column data store 410 in the shared cache 228 by initializing columns 440 for the attributes defined by the selected models 310. The synchronizer 255 creates pointers to memory locations in the shared cache 228 for each column 440.

In step 520, the synchronizer 225 retrieves the records included in the expected data set from the database repository 150. The synchronizer 225 retrieves the records by querying the database repository 150. For example, the database repository 150 may be a structured query language (SQL) based RDBMS, where the synchronizer 225 issues SQL queries as defined by the selected data types to retrieve records from the tables of the database repository 150.

In step 525, the synchronizer 225 stores data values from the retrieved records as contiguous entries in the appropriate columns 440. The columns 440 correspond to the attributes of the models 310. As the synchronizer 225 processes each retrieved record, the synchronizer 225 copies the individual data values into the appropriate column 440. The synchronizer 225 stores the first entry of a column 440 at the memory location of the pointer that the synchronizer 225 created for the column 440 in step 515. The data values from the first retrieved record become the first entries in the columns 440, the data values from the second retrieved record become the second entries in the columns 440, and so on. Thus, each data record that the synchronizer 225 retrieves is stored as multiple entries at the same index location in multiple columns 440.

In step 530, the synchronizer 225 provides address references of the columns 440 in the shared cache 228 to the applications 222. The address references may be the locations of the first entries of the columns 440 in the shared cache 228. The address references may be stored in a file that each application 222 is able to access.

Although the synchronizer creates the columns 440 in the shared cache 228, the address references provided to a model 310 may be virtual address locations. The model 310 may be used by an application 222 running in an execution environment 221 with a local address space of virtual memory. A memory map 315 translates the virtual address locations to physical memory locations in the columns 440 in the shared cache 228. The creation of the column data store 410 in the shared cache 228 that is outside of the virtual memory space of a single execution environment 221 allows the synchronizer 225 to provide address references to an interface used by multiple applications 222 in multiple execution environments 221. Therefore, multiple applications can use models 310, which have the virtual address locations mapped to the shared cache 228, to access the same data in the columns 440 concurrently.

In some embodiments of this invention, the operating system of the server computing system 115 or the program execution environment creates and maintains the memory map 315 of the shared cache 228. In such a case, the memory map 315 contains physical memory locations of the shared cache 228, but not necessarily the locations of the columns 440 in the shared cache 228. A synchronizer 225 would provide virtual address locations to an application 222 that represent offsets into the shared cache 228 for the physical memory location of the columns 440.

Figure 6:
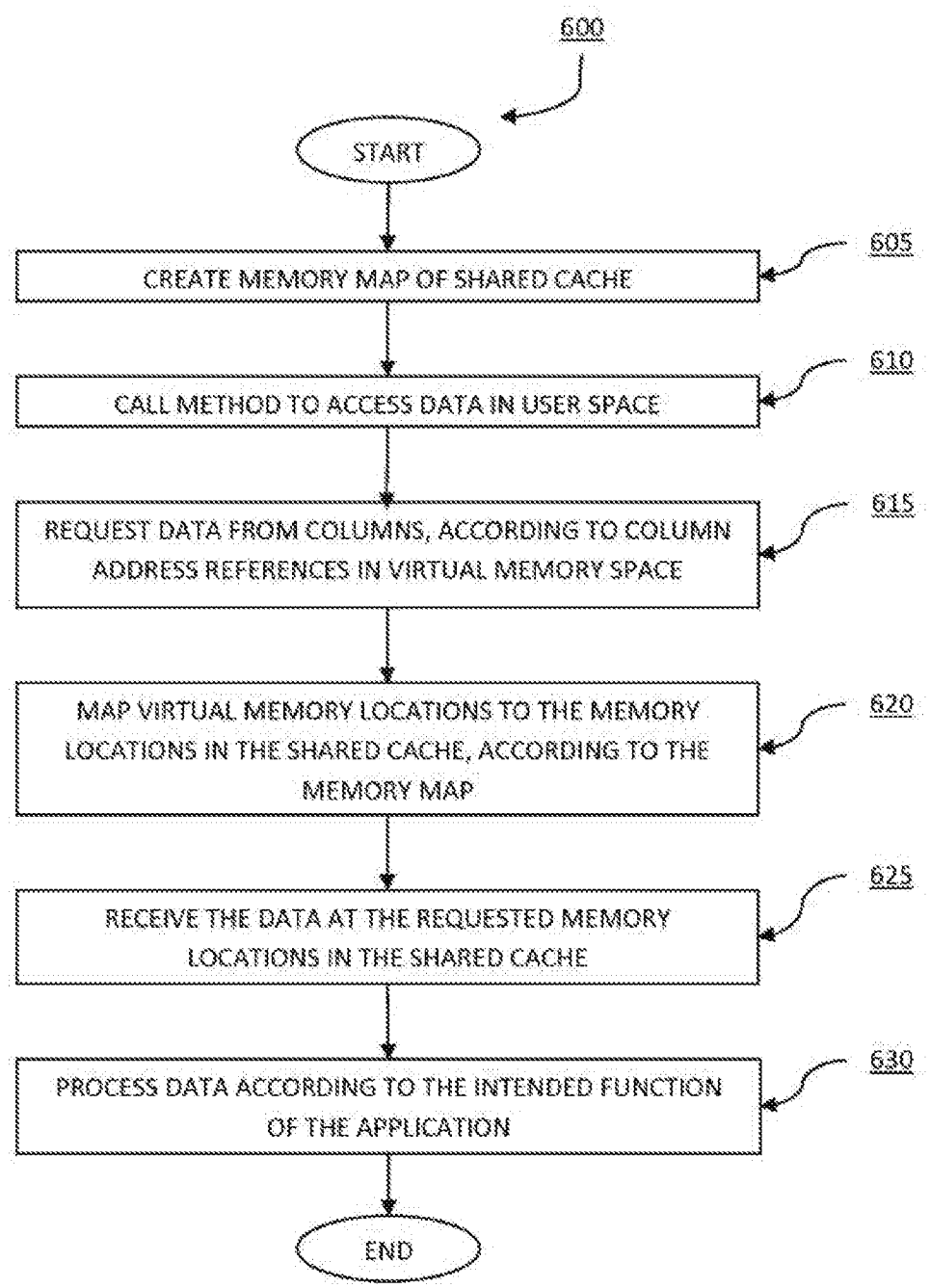
FIG. 6 illustrates a method for accessing a model in the shared cache from the point of view of an application, according to one embodiment.

FIG. 6 illustrates a method for accessing a model 310 in the shared cache 228 from the point of view of an application 222, according to one embodiment. Although the method steps are described in conjunction with the systems of FIGS. 1-4, persons of ordinary skill in the art will understand that any system configuration to perform the method steps, in any order, is within the scope of the invention.

As shown, method 600 begins at step 605, where the application 222 creates a memory map 315 of the shared cache 228. As discussed above, the memory map 315 identifies virtual memory locations and corresponding physical memory locations in the shared cache 228. The shared cache 228 is a memory mapped file, which the application 222 first opens and then maps into the execution environment's 221 memory. For example, assuming the application 222 is a Java® application, the application 222 opens the shared cache 228 file as a RandomAccessFile. Then the application 222 creates a MappedByteBuffer, which maps to the shared cache 228. Once the application 222 creates a MappedByteBuffer, the application 222 is able to read bytes of data from specific locations in the MappedByteBuffer that are mapped to locations in the shared cache 228. The application utilizes models 310 to read the data from the data structure in the shared cache 228.

In step 610, the application 222 makes a data access method call to retrieve the data of a model 310. Depending on how the data access method has been developed, the data access method may retrieve a subset of the raw data stored in the shared cache 228 or the data access method may retrieve an aggregate of the data stored in the shared cache 228.

In step 615, the interface requests data from address references in the memory mapped representation of the shared cache 228. According to one embodiment of the invention, the address references are locations of the first entries in the columns 440 of the column data store 410. The interface may request data beginning at the first entry of the column 440 or may calculate an offset location. If the application 222 is a Java® application, the requested memory locations are virtual memory locations in the MappedByteBuffer. As noted, the MappedBytebuffer is the memory mapped representation of the shared cache 228, so the MappedBytebuffer is included in the virtual address space of the execution environment 221 that the application 222 runs in.

In step 620, the operating system maps the virtual memory locations from the virtual address space of the execution environment 221 to the physical memory locations in the shared cache 228. According to one embodiment, the operating system identifies the virtual memory locations in a table in the memory map 315 and retrieves the corresponding physical memory locations.

In step 625, the application 222 receives the requested data from the shared cache 228. According to one embodiment of the invention, the operating system performs the memory mapping, so the application 222 receives the requested data as if the data had been requested from the address space of the execution environment 221.

In step 630, the application 222 processes the retrieved data according to the intended function of the data analysis application. For example, the application 222 may report some aggregate or subset of the requested data in the shared cache 228 to the client 110 or may issue additional data requests based upon the already retrieved data. This processing may occur as part of the data access method call or after the data access method call has returned.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method comprising:
receiving a list of models to include in an expected data set for a plurality of applications to analyze concurrently, the models including a combination of data attributes from a database repository, wherein the expected data set includes different types of models and different types of models include different data attributes;
identifying in the database repository, a portion of the database repository comprising a plurality of data attributes of the expected data set to be accessed concurrently by the plurality of applications;
allocating a memory space for a shared cache, wherein the shared cache comprises a column data store configured to store data for each of the plurality of attributes of the expected data set in columns;
retrieving the expected data set from a database;
populating the shared cache with the expected data set;
storing memory address locations corresponding to the columns of the column data store of the shared cache; and
providing, to the plurality of applications, one or more of the stored memory address locations corresponding to the columns of the column data store of the shared cache.

2. The method of claim 1, wherein each of the plurality of applications accesses the data set by:
requesting data from one or more memory locations in a virtual address space allocated to the application;
mapping memory locations in the virtual address space to corresponding memory address locations of the shared cache, via a memory map; and
accessing the requested data from the mapped memory locations in the shared cache.

3. The method of claim 1, wherein storing the data for each of the plurality of attributes of the expected data set in columns, comprises:
dividing one or more data records retrieved from the database into a plurality of attribute values;
identifying a contiguous memory location in the shared cache for each attribute value; and
storing each attribute value in one of the identified contiguous memory locations.

4. The method of claim 1, wherein a plurality of object-oriented representations of the expected data set are provided to the plurality of applications by:
initializing a plurality of objects with data access methods;
storing the memory address locations corresponding to the columns of the column data store of the shared cache in the objects; and
providing the plurality of objects for access by the plurality of applications.

5. The method of claim 4, wherein at least one of the plurality of applications access the data set by:
calling a data access method of one of the objects; and
receiving requested data from the data access method of the object.

6. The method of claim 1, wherein the shared cache is configured to provide read only access to the plurality of applications.

7. The method of claim 1, wherein the shared cache is updated by:

identifying a plurality of attributes of an updated expected data set;
re-allocating the memory space for the shared cache;
retrieving an updated expected data set from the database;
populating the shared cache with the updated expected data set; and
storing updated memory address locations corresponding to the columns of the column data store in the shared cache.

8. A non-transitory computer-readable storage medium storing instructions that, when executed by a processor, cause the processor to perform an operation for providing a plurality of applications with concurrent access to an expected data set from a database repository, the operation comprising:
receiving a list of models to include in the expected data set for a plurality of applications to analyze concurrently, the models including a combination of data attributes from the database repository, wherein the expected data set includes different types of models and different types of models include different data attributes;
identifying in the database repository, a portion of the database repository comprising a plurality of data attributes of the expected data set to be accessed concurrently by the plurality of applications;
allocating a memory space for a shared cache, wherein the shared cache comprises a column data store configured to store data for each of the plurality of attributes of the expected data set in columns;
retrieving the expected data set from a database;
populating the shared cache with the expected data set;
storing memory address locations corresponding to the columns of the column data store of the shared cache; and
providing, to the plurality of applications, one or more of the stored memory address locations corresponding to the columns of the column data store of the shared cache.

9. The non-transitory computer-readable storage medium of claim 8, wherein each of the plurality of applications accesses the data set by:
requesting data from one or more memory locations in a virtual address space allocated to the application;
mapping memory locations in the virtual address space to corresponding memory address locations of the shared cache, via a memory map; and
accessing the requested data from the mapped memory locations in the shared cache.

10. The non-transitory computer-readable storage medium of claim 8, wherein storing the data for each of the plurality of attributes of the expected data set in columns, comprises:
dividing one or more data records retrieved from the database into a plurality of attribute values;
identifying a contiguous memory location in the shared cache for each attribute value; and
storing each attribute value in one of the identified contiguous memory locations.

11. The non-transitory computer-readable storage medium of claim 8, wherein a plurality of object-oriented representations of the expected data set are provided to the plurality of applications by:
initializing a plurality of objects with data access methods;
storing the memory address locations corresponding to the columns of the column data store of the shared cache in the objects; and
providing the plurality of objects for access by the plurality of applications.

12. The non-transitory computer-readable storage medium of claim 11, wherein at least one of the plurality of applications access the data set by:
calling a data access method of one of the objects; and
receiving requested data from the data access method of the object.

13. The non-transitory computer-readable storage medium of claim 8, wherein the shared cache is configured to provide read only access to the plurality of applications.

14. The non-transitory computer-readable storage medium of claim 8, wherein the shared cache is updated by:
identifying a plurality of attributes of an updated expected data set;
re-allocating the memory space for the shared cache;
retrieving an updated expected data set from the database;
populating the shared cache with the updated expected data set; and
storing updated memory address locations corresponding to the columns of the column data store in the shared cache.

15. A computer system, comprising:
a memory storing one or more programs; and
a processor configured to execute the one or more programs to perform an operation for providing a plurality of applications with concurrent access to data, the operation comprising:
receiving a list of models to include in an expected data set for multiple applications to analyze concurrently, the models including a combination of data attributes from the database repository, wherein the expected data set includes different types of models and different types of models include different data attributes;
identifying in the database repository, a portion of the database repository comprising a plurality of data attributes of the expected data set to be accessed concurrently by the plurality of applications;
allocating a memory space for a shared cache, wherein the shared cache comprises a column data store configured to store data for each of the plurality of attributes of the expected data set in columns;
retrieving the expected data set from a database;
populating the shared cache with the expected data set;
storing memory address locations corresponding to the columns of the column data store of the shared cache; and
providing, to the plurality of applications, one or more of the stored memory address locations corresponding to the columns of the column data store of the shared cache.

16. The system of claim 15, wherein each of the plurality of applications accesses the data set by:
requesting data from one or more of the memory locations in a virtual address space allocated to the application;
mapping memory locations in the virtual address space to corresponding memory address locations of the shared cache, via a memory map; and
accessing the requested data from the mapped memory locations in the shared cache.

17. The system of claim 15, wherein storing the data for each of the plurality of attributes of the expected data set in columns, comprises:

dividing one or more data records retrieved from the database into a plurality of attribute values;

identifying a contiguous memory location in the shared cache for each attribute value; and storing each attribute value in one of the identified contiguous memory locations.

18. The system of claim 15, wherein a plurality of object-oriented representations of the expected data set are provided to the plurality of applications by:

initializing a plurality of objects with data access methods;

storing the memory address locations corresponding to the columns of the column data store of the shared cache in the objects; and providing the plurality of objects for access by the plurality of applications.

19. The system of claim 18, wherein at least one of the plurality of applications access the data set by:

calling a data access method of one of the objects; and receiving requested data from the data access method of the object.

20. The system of claim 15, wherein the shared cache is configured to provide read only access to the plurality of applications.

21. The system of claim 15, wherein the shared cache is updated by:

identifying a plurality of attributes of an updated expected data set;

re-allocating the memory space for the shared cache;

retrieving an updated expected data set from the database;

populating the shared cache with the updated expected data set; and storing updated memory address locations corresponding to the columns of the column data store in the shared cache.

* * * * *